United States Patent [19]

Finkensiep et al.

[11] 4,196,163

[45] Apr. 1, 1980

[54] PRODUCTION OF STRIPPED SOAP STRANDS AND APPARATUS FOR ITS PRODUCTION

[75] Inventors: Friedhelm Finkensiep, Krefeld-Uerdingen; Reinhold W. Meye, Krefeld, both of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 905,536

[22] Filed: May 12, 1978

[30] Foreign Application Priority Data

May 14, 1977 [DE] Fed. Rep. of Germany ....... 2722020

[51] Int. Cl.[2] ........................................... B29F 3/12

[52] U.S. Cl. ............................. 264/148; 264/171; 264/245; 264/320; 425/131.1; 425/204; 425/208; 425/462

[58] Field of Search ............... 264/171, 148, 211, 349, 264/75, 245, 320; 425/131.1, 204, 208, 462

[56] References Cited

U.S. PATENT DOCUMENTS

| | | | |
|---|---|---|---|
| 2,332,329 | 10/1943 | Parsons et al. | 264/75 |
| 3,359,350 | 12/1967 | Godfrey | 264/108 |
| 3,384,693 | 5/1968 | Roe, Jr. | 264/349 |
| 3,779,676 | 12/1973 | Bernard | 264/131.1 |
| 3,817,276 | 6/1974 | Maiocco | 425/130 |
| 3,823,215 | 7/1974 | D'Arcangeli | 264/75 |
| 3,884,605 | 5/1975 | Grelon | 264/75 |
| 3,999,921 | 12/1976 | Thor | 425/204 |
| 4,094,946 | 6/1978 | Finkensiep et al. | 425/131.1 |

FOREIGN PATENT DOCUMENTS 2533032 10/1977 Fed. Rep. of Germany .

*Primary Examiner*—Jeffery R. Thurlow

*Attorney, Agent, or Firm*—Hammond & Littell, Weissenberger and Muserlian

[57] ABSTRACT

A method for the production of multi-color striped pieces of soap by continuously extruding two strands of colored soap, passing said two strands of colored soap through a die orifice whereby a single strand of parallel stripes is formed having a varied colored aspect in cross section, passing said single strand through a static mixer having a different configuration from said die orifice, cutting said strand and recovering multi-color striped pieces of soap, as well as the apparatus.

9 Claims, 9 Drawing Figures

PRODUCTION OF STRIPPED SOAP STRANDS AND APPARATUS FOR ITS PRODUCTION

BACKGROUND OF THE INVENTION

Extruders for the production of two-color soap strands are known in the art. U.S. Pat. No. 3,999,921 describes the manufacture of a two-color strand of soap by using two coaxially interfaced screws each having one screw thread for feeding various type, specifically variously colored compounds to a die nozzle via separately provided conveyor spaces. The outer screw thread runs counter the pitch of the stationary-arranged inner screw thread. Furthermore, the outer screw carries at its end section facing the die relief a mixing element with blade-type mixing tools projecting both into the annular conveyor space of the inner screw and the annular conveyor space of the outer screw for mixing the extruded strand to give a marbled structure.

In the case of an uncolored soap stream and a colored soap stream being extruded respectively from the two conveyors, it can happen that the color component inside the soap gets mixed in such a fashion that portions thereof are on the surface of the soap strand with the subsequent result that an undesirably colored foam is produced in use. Because of the rotating mixing element, the known device, furthermore, can be used only for manufacturing soap streams with a marbled, that is, quite undefined structure. Though clearly defined type of singular color zones can be obtained by using a high-percentual colorant component, this leads then to an overdosaging of the colorant component and can result in high losses produced by colored soap residues.

A sharp and generally regular striping in soap strings and/or pieces of soap manufactured from them can be obtained by using a process according to either U.S. patent application Ser. No. 695,455, filed June 14, 1976, now U.S. Pat. No. 4,094,946 or German Published Application DOS No. 2,533,032. The U.S. Patent discloses a single extruder provided with a hopper at one end and a restricted nozzle at the opposite end and two press screws arranged coaxially in one another within an outer jacket, each of said screws being provided with a male thread for feeding in the direction of said nozzle, said male threads extending into an outer annular space between said jacket and the outer press screw and extending into an inner annular space between said two press screws, said threads being oppositely oriented, means to rotate the outer of said two press screws and means to maintain the inner of said two press screws stationary, said outer press screw and being provided with windowlike openings communicating with said inner press screw in the area of said hopper and separate feed means in said hopper to separately feed to the area between said outer jacket and said outerpress screw and to the area between said outer press screw and said inner press screw through said windowlike openings, whereby said material being conveyed by said outer press screw and said material being conveyed by said inner press-screw are substantially equal and conveyed at substantially the same rate by rotation of the outer press screw, the improvement consisting in that said restricted nozzle is provided with two channels having a predetermined outlet cross-section with the outer channel at the inlet completely encompassing the inner channel, said outer channel at the inlet being fed from said outer press screw and said inner channel at the inlet being fed from said inner screw, the outlet cross-section of said inner channel being other than circular, whereby the outer edge of said inner channel cross-section at the outlet is coextensive with the other channel cross-section.

In this apparatus, the chambered restricted nozzle is so developed that it divides the various-colored, screw-fed soap strands into parallel inter- and adjoining flow stripes.

The German Published application describes the use of two separate volume-controlled screw extruders which are interconnected at the output by a Y-tube which feeds to the outlet cone. In the Y-tube at the confluence area of the joining extruded streams, an insert part is disposed with disk-type, parallel chambers, which are in alternate connection with one of the applicable exit cross-sections of both extruders. With either of these devices no uncontrolled mixups of singular stripes in the soap string occur, so that sharply delineated color regions are produced.

OBJECTS OF THE INVENTION

An object of the present invention is to produce a device, by means of which soap strands and/or pieces of soap with well-defined striping can be manufactured but which stripes at their edges blend into each other.

Another object of the present invention is the development of a process for the production of multicolor striped pieces of soap where the edges of the stripes blend into each other comprising the steps of continuously extruding two strands of colored soap, each strand having a different color, said extrusion being at a substantially equal rate for each strand, passing said two strands of colored soap through separate die orifices within a radial cross-section whereby said two strands of colored soap are combined in a predetermined cross-section having at least two parallel stripes from each of said two strands, the edges of said parallel stripes being sharply delineated, and compressed, passing said combined compressed strand through a static mixer having die orifices different from said separate die orifices, and compressing, cutting said compressed strand having edges of said parallel stripes which are not sharply delineated and recovering multicolor striped pieces of soap where the edges of the stripes blend into each other.

A further object of the present invention is the development of an extrusion path for an extruder designed to extrude two soap strands of different color at substantially the same rate consisting in a restricted nozzle provided with two channels supplied by said two soap strands, said restricted nozzle having a predetermined outlet cross-section resulting in at least two parallel stripes from each of said two strands, the edges of said parallel stripes being sharply delineated and coextensive, a static mixer having die orifices different from said restricted nozzle downstream from said restricted nozzle, and a compression zone downstream from said static mixer.

These and other objects of the invention will become more apparent from the description thereof.

THE DRAWINGS

DESCRIPTION OF THE INVENTION

Figure 9:
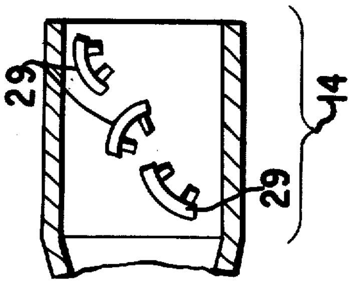
FIG. 9 is another embodiment of a longitudinal cross-section of the extrusion path of the invention with left and right handed helical flights as the static mixer.

The drawbacks of the prior art have been overcome and the above objects achieved by the development of a device for the manufacture of multicolor striped soap strands by means of at least one extruder supplying two different colored soap strands having at the output a die orifice whereby the two strands are formed into a single strand having parallel stripes of sharply defined color characterized in that, to obtain an interflow between the color zones at least on static mixer differing in design and/or partition form said die orifice is series connected to the die orifice.

More particularly the present invention relates to a process for the production of multicolor striped pieces of soap where the edges of the stripes blend into each other comprising the steps of continuously extruding two strands of colored soap, each strand having a different color, said extrusion being at a substantially equal rate for each strand, passing said two strands of colored soap through separate die orifices within a radial cross-section whereby said two strands of colored soap are combined in a predetermined cross-section having at least two parallel stripes from each of said two strands, the edges of said parallel stripes being sharply delineated, and compressed, passing said combined compressed strand through a static mixer having die orifices different from said separate die orifices, and compressing, cutting said compressed strand having edges of said parallel stripes which are not sharply delineated and recovering multicolor striped pieces of soap where the edges of the stripes blend into each other.

This process is conducted by the use of an extrusion path for an extruder designed to extrude two soap strands of different color at substantially the same rate consisting in a restricted nozzle provided with two channels supplied by said two soap strands, said restricted nozzle having a predetermined outlet cross-section resulting in at least two parallel stripes from each of said two strands, the edges of said parallel stripes being sharply delineated and coextensive, a static mixer having die orifices different from said restricted nozzle downstream from said restricted nozzle, and a compression zone downstream from said static mixer.

It is essential that in the outflow cone, stationary guide channels in compartmentalized form are arranged, which extend into or to just before the exit cross-section of the two extruded strands. These guide channels are arranged so that, for example, in the case of radially ray-shaped cross-section design of the extruded soap structure, every other vane section is supplied by the centrally fed soap mass, and the vane sections therebetween by the soap mass supplied by the second screw.

In principle, the key to the invention is to post-stage the arrangements for manufacturing soap strands having sharply bordered color zones and/or stripes, according to the above and the extruders of U.S. Pat. No. 4,094,946 and German DOS No. 2,533,032, by at least one further static mixer. According to invention then by using at least two static mixers, that is, the die orifice or the above patent and another static mixer, which can differ in its design and partitions, in series-connection with a coaxial worm extruder or two singular extruders, a well-defined but interflowing type of color stripe is producible in a soap strand and/or piece of soap manufactured from it. In this sense the second or following static mixer serves to interface with the exact, sharply delineated striping in regular or irregular stripes obtainable with the processes or devices according to the above prior art.

A further favorable feature of the invention is to select the partition number of the second mixer smaller than that of the first mixer, whereby specifically the partition of the first mixer can range between four and infinite. The partitions of the second mixer will number from less than to the same amount. If simultaneously the partition of the second mixer relative to that of the first is offset, then the problem, on which the invention is based, can be solved in a particularly advantageous manner.

On dividing up the soap strand produced according to the invention into blanks and on their die molding, the result is pieces of soap with a visibly impressive esthetic effect, which is expressed in well defined but boundary-interflowing stripes of various colors, which emphasizes the esthetic effect.

According to the invention one or more disks with openings can be used as static mixers. Thereby the openings can be of a regular or irregular form and arrangement (e.g., oblong hole or slit). Instead of disks also a sheet metal formed body can be used, which has regular or irregular formed passages. In singular cases the image required according to the object of the invention can be improved further by extruding the soap strand through further perforated disks, the division of which for best results too, is offset, relative to preceding disks. Thereby the striping shifts, and the edges between clearly colored stripes get increasingly blurred. It is also of advantage to use static mixers of completely different design instead of perforated disks, e.g., mixed elements made of rods and joined together to form a criss-crossed construction with open channels. A favorable effect is produced also by static mixers consisting of right and left-handed helical flights sequentially set in a tubular housing.

Figure 2:
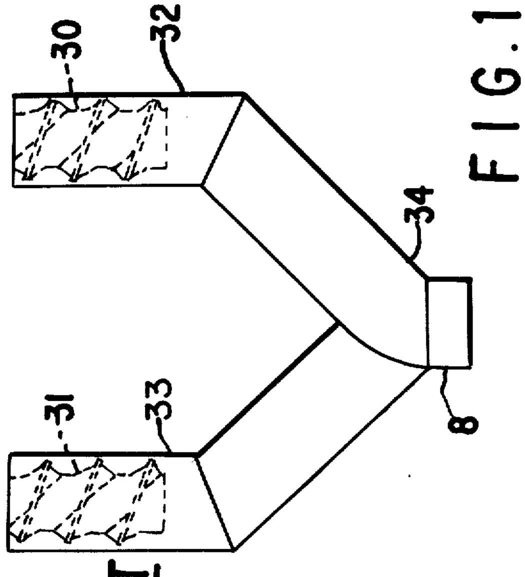
FIG. 2 PRIOR ART
FIG. 2 is a longitudinal cross-section through another extruder, partially broken away, representing the prior art.
Figure 1:
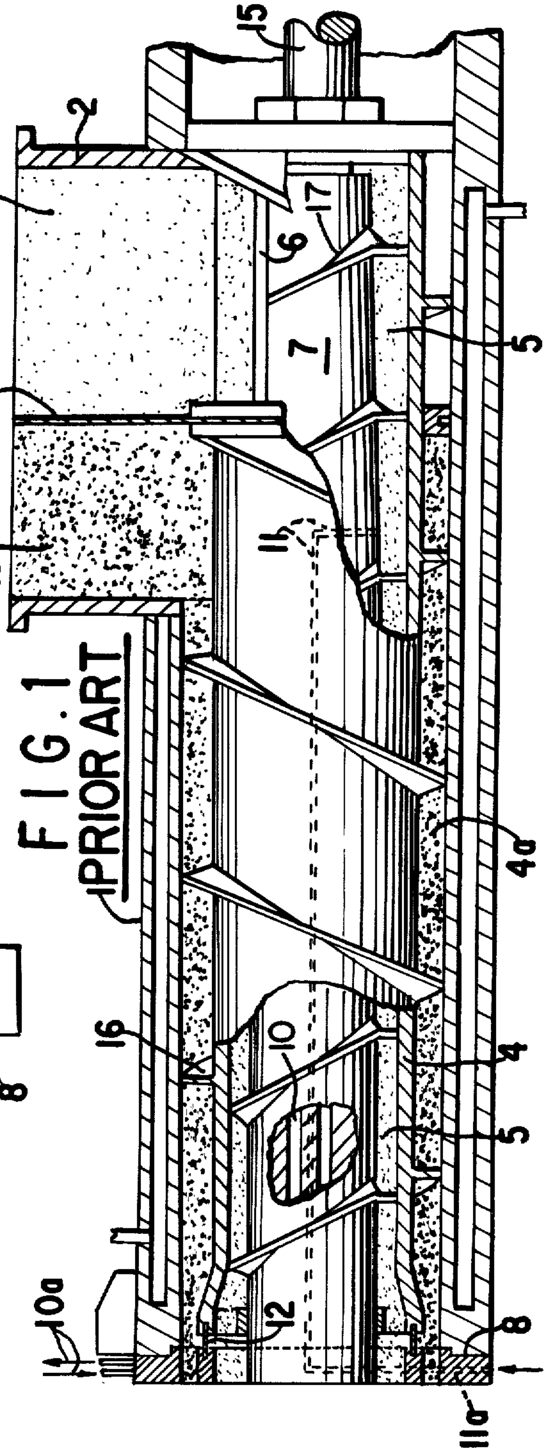
FIG. 1 PRIOR ART
FIG. 1 is a longitudinal cross-section through an extruder, partially broken away, representing the prior art.

In the drawings, FIGS. 1 and 2 show the conventional extruders of the prior art with an outlet orifice giving a two-colored soap strand. The single biaxial extruder as shown in FIG. 1 consists of two screws 4, 7 arranged coaxially one in another in an outer jacket 1 and each carrying a male screw thread for feeding different plastic materials to the outflow. The outer screw 4 can be driven through drive shaft 15 by means of a drive (not shown). The inner screw 7 is stationary. Window type opening 6 in the outer screw 4 is provided in the area of the charging hopper 2, which establishes a connection of the inner screw 7 with the charging material.

The threads 16 of the outer screw 4 are oppositely oriented relative to the threads 17 of the inner screw 7. The inner screw 7 also may have bores or channels 10 for the circulation of a coolant. In addition, bore or bores 11 can also be provided in screw 7 for the introduction of liquid additives into the space between the threads 17 of the inner screw 7.

At the outflow cone end of the outer screw 4, the axial inner cylindrical space 5 is sealed from the conveyor space 4a by the ring 12 which extends to within the inlet of the stationary supporting grid 8.

The extruder works as follows:

The stationary outer jacket 1 which is heatable and coolable has a charging hopper 2 at the rear end, which is divided by a partition 2a into two chambers, one 18 feeding into conveyor space 4a and the other 19 feeding into conveyor space 5, and an exit at the end of the outer jacket 1. Within the outer jacket 1 rotates the outer screw 4, which is set in rotation over an outer drive shaft 15. The screw 4 is provided with screw threads 16 with an axial inner cylindrical space 5 and with window-type openings 6. The space 5 is in communication through the openings 6 with chamber 19 of charging hopper 2. In the space 5 is also arranged the screw 7 with oppositely directed threads 17. The screw 7 does not rotate, but is frictionally connected over the supporting grate 8 which is clamped beyond the outer jacket 1. The supporting grate 8 is provided with inlet and outlet pipes 10a in connection with the bores 10 within screw 7 and an inlet pipe 11a in connection with bore 11. The product can flow through the charging hopper 2, on the one hand, to the male thread 16 of the rotating screw 4 and, on the other hand, over the openings 6 into the space 5, and thus to the screw 7. Due to the rotation of the screw 4, there is a double conveying and compressing process of the product; on the one hand, over the male threads 16 of the moving screw 4 regarding the fixed inner wall of the jacket 1, and on the other hand, over the rotating inner surface of the screw 4 relative to the stationary screw 7 and the threads 17.

Through the inlet pipe 10a, a coolant is introduced through bores 10 into the inner screw 7 and frictional heat, if any, is eliminated. If necessary, a heat supplying medium can be conducted through the bores 10, depending on the product to be processed.

Through the inlet pipe 11a a liquid dye can be introduced through bore or bore 11 provided in the inner screw 7 into the inner material current. The bores 11 open into the space between the threads 17 of the inner screw 7, substantially in the central region of the screw 7.

The double extruder of FIG. 2 consists of separate press screws 30 and 31 in conveyors 32 and 33. The conveyors convey separately colored soap particles to the Y-shaped confluence 34 which at its outlet has a similar cross-section to the stationary supporting grid 8.

Figure 3:
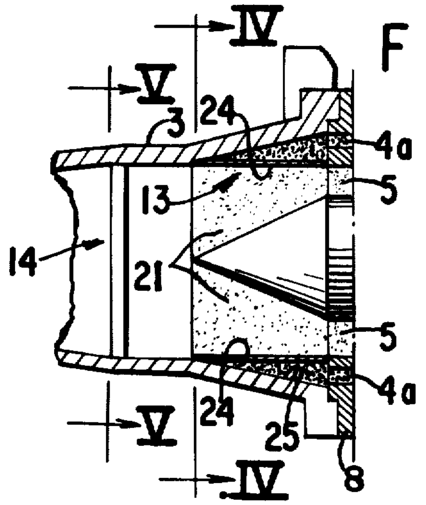
FIG. 3 is a longitudinal cross-section of one type of an extrusion path of the invention.
Figure 4:
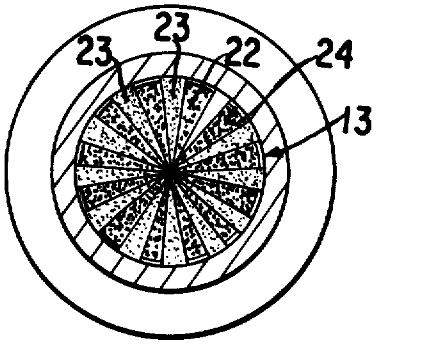
FIG. 4 is a view of a cross-section along line IV—IV of FIG. 3.

The extrusion path of the invention is shown in FIG. 3 in longitudinal cross-section. In the outflow cone 3, the respective mixing element 13 of stationary guide channels in compartmentalized form are fastened on the supporting grid 8 and extend into the outflow cone 3. Cross-sections of the mixing element 13 along line IV—IV are shown in FIG. 4. The outlet area of the conveyor space 4a is shown in one type of dotting and the outlet area of the axial inner cylindrical space 5 is shown in a different type of dotting.

With reference to mixing element 13 which has radial rays of different colors in cross-section, every other vane compartment 22 is fed from the conveyor space 4a and the alternative vane compartments 23 are fed from the axial inner cylindrical space 5.

In FIG. 3, the two outer sections 21 of a vane compartment 22 are shown. The radial extremity of the vane compartments 22 are closed by a wall 24 extending from the inlet to the outlet of mixing element 13. The material fed from space 5 expands to fill the vane compartments 22. Vane compartments 23 are closed at the inlet end by a wall (not shown) and are open at their radial extremities. The material fed from space 4a is distributed by the action of the sloping wall 25 of the outflow nozzle 3 into vane compartments 23, filling the same. Mixing elements 13 of different types can be employed as is disclosed in U.S. Pat. No. 4,094,946 and German DOS No. 2,533,302.

Downstream from mixing element 13 in outflow nozzle 3 is a second static mizer 14 having die orifices different from the orifices of mixing element 13. Between mixing element 13 and the second static mixer 14 in outflow nozzle 3, the diameter thereof remains constant or becomes only slightly restricted toward the second static mixer 14. After the second static mixer 14, the walls of the outflow nozzle 3 converge slightly to effect a final compression of the extruded strand. Of course, if a further blurring of the different colors in the extruded soap strand is desired, one or more further static mixers 14 can be inserted in the outflow nozzle.

Figure 5:
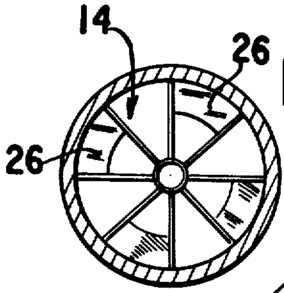
FIG. 5 is a view of a cross-section along line V—V of FIG. 3 showing the static mixer.

In FIGS. 4 and 5 a mixing element 13 and a static mixer 14 are schematized, which can be interpolated in the course of the soap strand by post-staging them to an extruder. The first mixing element 13 interpolated according to FIG. 4 has partitions exceeding that of the second soap strand interpolated mixer 14 as shown in FIG. 5. If a slight shift is required of the soap strand striping emerging from the first mixing element, then for best results, the second static mixer 14 accordingly is offset relative to the first. Thorough mixing is effected in the second static mixer 14 by blocking part of each alternate compartment by a solid wall 26.

Figure 6:
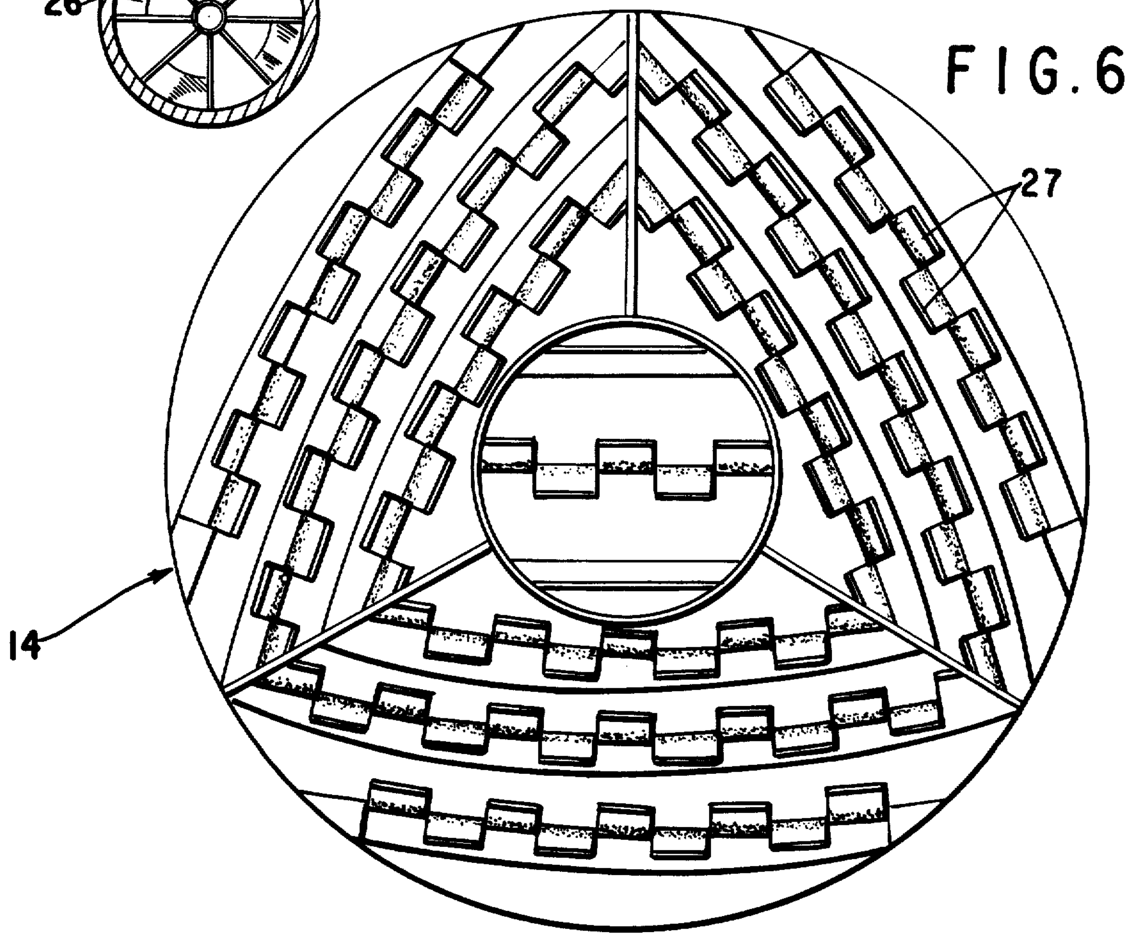
FIG. 6 is another embodiment in cross-section along line V—V of FIG. 3 of a static mixer.

The parallel disk-type static mixer 14 shown in a schematized top view (FIG. 6) can be used as a second and/or further static mixer to be put into the path of the input soap strand. This mixer consists of a series of half round disks along parallel lines which partially divert the flow of the soap strand.

With the Y-tube arrangement of FIG. 2, in the confluence region of which two or more single-color volume streams are combined, it can be of advanage also to provide guide plates as mixing element 13, which are in alternate connection with one of the input single-color soap streams. With the extruder of FIG. 1, the mixing element 13 comprising stationary and open-chambered guide plates, which divide the various colored soap compounds in parallel inter- and co-flowing stripes or marbling.

Figure 7:
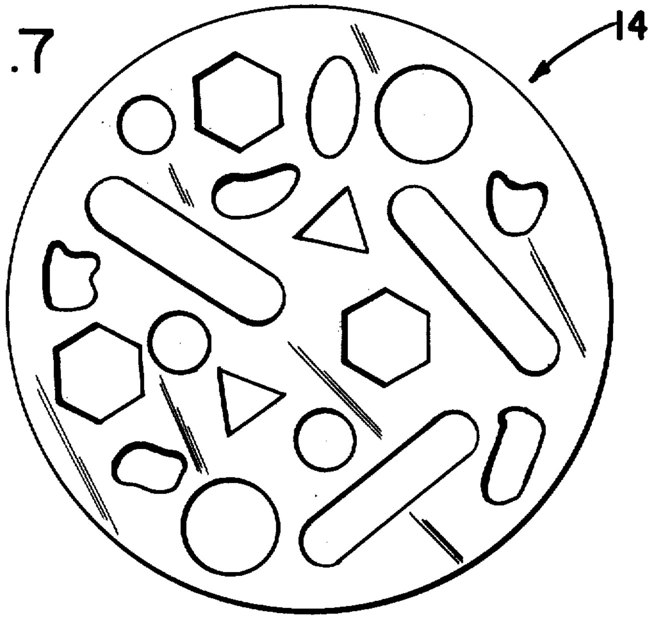
FIG. 7 is another embodiment in cross-section along line V—V of FIG. 3 of a static mixer.
Figure 8:
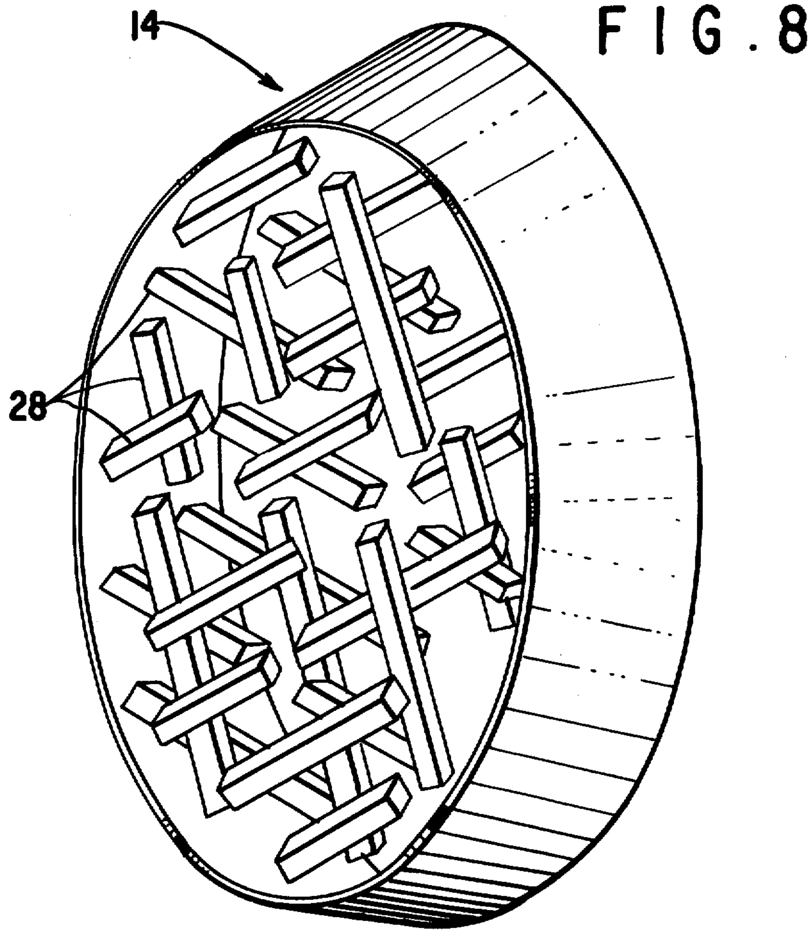
FIG. 8 is another embodiment in cross-section along line V—V of FIG. 3 of a static mixer.

Of advantage also are the static mixers 14 of a breaker plate type according to FIG. 7, which can have one or more openings of a regular or irregular shape and arrangement. In FIG. 7 oblong holes, slits and round holes of various marginal design are schematized. The static mixer 14 according to the invention can also consist of a sheet metal body with appropriate openings according to FIG. 8, which shows regular or irregular shaped passages formed by small rods 28 which are welded in place.

Finally the static mixer 14 as shown in FIG. 9 can consist of a series of right and left-handed helical flights 29 in the substantially tubular extension of outflow nozzle 3.

Beyond the static mixer 14 the outflow nozzle is constricted thus compacting the extruded strand. The compacted extruded strand is subsequently divided into blanks which are then stamped into cakes of soap.

The preceding specific embodiment is illustrative of the practice of the invention. It is to be understood, however, that other expedients known to those skilled in the art or disclosed herein may be employed without departing from the spirit of the invention or the scope of the appended claims.

We claim:

1. A process for the production of multicolor striped pieces of soap where the edges of the stripes blend into each other comprising the steps of continuously extruding two strands of colored soap, each strand having a different color, said extrusion being at a substantially equal rate for each strand, passing said two strands of colored soap through separate die orifices within an extended radial cross-section whereby said two strands of colored soap are combined in a predetermined cross-section having at least two parallel stripes from each of said two strands, the edges of said parallel stripes being sharply delineated and compressed, passing said combined compressed strand, still within said extended radial cross-section through a static mixer within said extended radial cross-section having die orifices different from said separate die orifices, and compressing, cutting said compressed strand having edges of said parallel stripes which are not sharply delineated and recovering multicolor striped pieces of soap where the edges of the stripes blend into each other without having a marbled structure.

2. The process of claim 1 wherein said predetermined cross-section consists of alternately colored, pie-shaped parallel stripes and said static mixer has pie-shaped partitions which are fewer than said pie-shaped parallel stripes.

3. An extrusion path for an extruder designed to extrude two soap strands of different color at substantially the same rate consisting in a restricted nozzle provided with two channels supplied by said two soap strands, said restricted nozzle having a predetermined outlet cross-section resulting in at least two parallel stripes from each of said two strands, the edges of said parallel stripes being sharply delineated and coextensive, a static mixer having die orifices different from said restricted nozzle designed to blur sharply delineated color zones without marbleizing the same, downstream from said restricted nozzle, and a compression zone downstream from said static mixer.

4. The extrusion path of claim 3 wherein said predetermined cross-section consists of alternately colored, pie-shaped parallel stripes and said static mixer has pie-shaped partitions which are fewer than said pie-shaped parallel stripes.

5. The extrusion path of claim 4 wherein said static mixer having pie-shaped partitions is offset relative to said predetermined cross-section.

6. The extrusion path of claim 3 wherein said static mixer has a series of half-round disks along parallel lines.

7. The extrusion path of claim 3 wherein said two channels are supplied by a single coaxial extruder.

8. The extrusion path of claim 3 wherein said static mixer is a breaker plate with many irregular openings.

9. The extrusion path of claim 3 wherein said static mixer is formed by small rods giving irregular shaped openings therethrough.

* * * * *